(12) United States Patent
Allegrucci

(10) Patent No.: US 6,721,840 B1
(45) Date of Patent: Apr. 13, 2004

(54) METHOD AND SYSTEM FOR INTERFACING AN INTEGRATED CIRCUIT TO SYNCHRONOUS DYNAMIC MEMORY AND STATIC MEMORY

(75) Inventor: Jean-Didier Allegrucci, Sunnyvale, CA (US)

(73) Assignee: Triscend Corporation, Mountain View, CA (US)

( * ) Notice: Subject to any disclaimer, the term of this patent is extended or adjusted under 35 U.S.C. 154(b) by 363 days.

(21) Appl. No.: 09/642,505

(22) Filed: Aug. 18, 2000

(51) Int. Cl.[7] .................................................. G06F 1/11
(52) U.S. Cl. ........................ 710/306; 710/309; 710/311; 711/150; 711/168
(58) Field of Search ................................ 710/305–307, 710/308, 311, 312, 316, 313, 314, 315, 309; 711/104–105, 117, 131, 149, 147, 150, 168; 365/51, 63, 189.01, 189.05, 222

(56) References Cited

U.S. PATENT DOCUMENTS

| | | | |
|---|---|---|---|
| 4,314,353 A | 2/1982 | Gunter et al. | |
| 4,789,951 A | 12/1988 | Birkner et al. | |
| 4,870,302 A | 9/1989 | Freeman | |
| 5,093,915 A | 3/1992 | Platteter et al. | |
| 5,140,193 A | 8/1992 | Freeman et al. | |
| 5,206,940 A | 4/1993 | Murakami et al. | |
| RE34,363 E | 8/1993 | Freeman, deceased | |
| 5,343,406 A | 8/1994 | Freeman et al. | |
| 5,347,641 A | 9/1994 | Cedar et al. | |
| 5,369,314 A | 11/1994 | Patel et al. | |
| 5,394,528 A | 2/1995 | Kobayashi et al. | |

(List continued on next page.)

FOREIGN PATENT DOCUMENTS

| | | | |
|---|---|---|---|
| EP | 0062431 A1 | 3/1982 | |
| EP | 0139254 A2 | 9/1984 | |
| EP | 0307649 A2 | 8/1988 | |
| EP | 0306962 A2 | 9/1988 | |
| EP | 0361525 A2 | 9/1989 | |
| EP | 0486248 A2 | 11/1991 | |
| EP | 0503498 A2 | 4/1992 | |
| EP | 0511674 A2 | 4/1992 | |
| EP | 0536793 A2 | 10/1992 | |
| EP | 0636976 A1 | 7/1994 | |
| EP | 0742516 A2 | 4/1996 | |
| EP | 0 691 616 A1 | * 10/1996 | ........... G06F/13/16 |
| GB | 2297409 A | 1/1996 | |

OTHER PUBLICATIONS

PCT International Search Report, PCT/US99/24114, Apr. 25, 2000.
IBM Technical Disclosure Bulletin, "Efficient Mechanism for Mutiple Debug Modes," vol. 38, No. 11, Nov. 1995, pp. 65–68.
IBM Technical Disclosure Bulletin, LOGUE, J.C., And Wu, W.W. "System Master Slice for Fast Turnaround Time," XP–000714153, vol. 26, No. 3B, Aug. 1983, pp. 1531–1352.
IBM Technical Disclosure Bulletin, "Protocol Extensions to Microprocessor Memory Bus to Support Extend Extended Address Space" XP–000453193, vol. 37, No. 05, May 1994, pp. 389.
IBM Technical Disclosure Bulletin, "Update Mechanism for Personal Computer System Resident Firmware," XP–000302663, vol. 34, No. 10B, Mar. 1992, pp. 133–136.

*Primary Examiner*—Paul R. Myers
*Assistant Examiner*—Raymond N Phan
(74) *Attorney, Agent, or Firm*—Blakely, Sokoloff, Taylor & Zafman LLP

(57) ABSTRACT

A integrated circuit includes a processor, a bus coupled to the processor, a memory interface and an interface bus. The memory interface provides an interface between the bus and at least two memory devices including a first memory device and a second memory device. The interface bus is coupled to the first memory device, the second memory device and the memory interface. Control signals, address signals and data signals are transmitted over the interface bus.

28 Claims, 5 Drawing Sheets

U.S. PATENT DOCUMENTS

| | | |
|---|---|---|
| 5,402,014 A | 3/1995 | Ziklik et al. |
| 5,423,009 A | 6/1995 | Zhu |
| 5,432,950 A | 7/1995 | Sibigtroth |
| 5,448,493 A | 9/1995 | Topolewski et al. |
| 5,488,316 A | 1/1996 | Freeman et al. |
| 5,504,439 A | 4/1996 | Tavana |
| 5,504,875 A | 4/1996 | Mills et al. |
| 5,515,507 A | 5/1996 | Byers et al. |
| 5,592,102 A | 1/1997 | Lane et al. |
| 5,603,041 A | 2/1997 | Carpenter et al. |
| 5,634,105 A * | 5/1997 | Mizuno ............... 710/211 |
| 5,635,851 A | 6/1997 | Tavana |
| 5,651,138 A * | 7/1997 | Le et al. ............... 711/18 |
| 5,681,107 A | 10/1997 | Wang |
| 5,710,891 A | 1/1998 | Normoyle et al. |
| 5,729,764 A | 3/1998 | Sato |
| 5,774,684 A | 6/1998 | Haines et al. |
| 5,784,637 A | 7/1998 | Sawase et al. |
| 5,784,700 A * | 7/1998 | Chen et al. ............ 711/172 |
| 5,784,912 A | 7/1998 | Focken et al. |
| 5,818,255 A | 10/1998 | New et al. |
| 5,825,202 A | 10/1998 | Tavana et al. |
| 5,833,525 A | 11/1998 | Hanlon et al. |
| 5,834,947 A | 11/1998 | Cedar et al. |
| 5,844,424 A | 12/1998 | Krishnamurthy et al. |
| 5,844,854 A | 12/1998 | Lee |
| 5,847,580 A | 12/1998 | Bapat et al. |
| 5,880,597 A | 3/1999 | Lee |
| 5,901,295 A | 5/1999 | Yazdy |
| 5,911,082 A | 6/1999 | Monroe et al. |
| 5,930,484 A | 7/1999 | Tran et al. |
| 5,935,230 A | 8/1999 | Pinai et al. |
| 5,936,424 A | 8/1999 | Young et al. |
| 5,942,913 A | 8/1999 | Young et al. |
| 5,963,050 A | 10/1999 | Young et al. |
| 5,982,195 A | 11/1999 | Cliff et al. |
| 6,012,122 A * | 1/2000 | Choi et al. ............ 711/105 |
| 6,020,757 A | 2/2000 | Jenkins, IV |
| 6,020,758 A | 2/2000 | Patel et al. |
| 6,023,742 A | 2/2000 | Ebeling et al. |
| 6,047,347 A | 4/2000 | Hansen et al. |
| 6,067,515 A | 5/2000 | Cong et al. |
| 6,085,317 A | 7/2000 | Smith |
| 6,088,761 A * | 7/2000 | Aybay ................. 711/105 |
| 6,094,065 A | 7/2000 | Tavana et al. |
| 6,107,827 A | 8/2000 | Young et al. |
| 6,108,824 A | 8/2000 | Fournier et al. |
| 6,141,739 A * | 10/2000 | Provence et al. ........ 711/211 |
| 6,184,705 B1 | 2/2001 | Cliff et al. |
| 6,191,608 B1 | 2/2001 | Cliff et al. |
| 6,212,639 B1 | 4/2001 | Erickson et al. |
| 6,233,193 B1 * | 5/2001 | Holland et al. ........ 365/222 |
| 6,233,646 B1 * | 5/2001 | Hahm ................. 711/12 |
| 6,236,245 B1 | 5/2001 | Papaliolios |
| 6,259,286 B1 | 7/2001 | Papaliolios |
| 6,260,101 B1 * | 7/2001 | Hansen et al. ............ 711/5 |
| 6,282,627 B1 | 8/2001 | Wong et al. |
| 6,298,366 B1 | 10/2001 | Gatherer et al. |
| 6,456,517 B2 * | 9/2002 | Kim et al. ............. 365/51 |
| 6,467,009 B1 | 10/2002 | Winegarden et al. |
| 6,473,831 B1 * | 10/2002 | Schade ............... 711/115 |
| 6,496,880 B1 * | 12/2002 | Ma et al. .............. 710/38 |

* cited by examiner

| CHIP PINS | 201 | SRAM PINS | 221 | SDRAM PINS | 241 |
|---|---|---|---|---|---|
| CEN[3:0] | 202 | CE[3:0] | 222 | | |
| OEN | 203 | OEN | 223 | | |
| WEN | 204 | WE | 224 | WE | 244 |
| A[23:0] | 205 | A[23:0] | 225 | RAS | 245 |
| | | | | CAS | 246 |
| | | | | DQM[3:0] | 247 |
| | | | | BS[1:0] | 248 |
| | | | | A[12:0] | 249 |
| | | | | | |
| DQ[31:0] | 211 | DQ[31:0] | 231 | DQ[31:0] | 251 |
| SDCLK | 212 | | | CLK | 252 |
| SDCKE | 213 | | | CKE | 253 |
| SDCEN[1:0] | 214 | | | CS[1:0] | 254 |

FIG. 2

METHOD AND SYSTEM FOR INTERFACING AN INTEGRATED CIRCUIT TO SYNCHRONOUS DYNAMIC MEMORY AND STATIC MEMORY

The present invention relates to the field of integrated circuits. More particularly, the present invention relates to techniques for interfacing integrated circuits to external memory.

BACKGROUND OF THE INVENTION

Processing systems generally include a central processing unit (CPU), logic, internal memory, and a system bus coupling the CPU, logic and internal memory. It is often necessary in processing systems to interface the system bus with external memory. The external memory may include static memory, such as flash memory, or dynamic memory such as synchronized dynamic random access memory (SDRAM).

One approach to interfacing a processor system to an external memory includes using a memory interface. In a programmable or configurable system on a chip, a memory interface having programmable input/output pins (PIO) may be used. The PIO pins of the memory interface are programmed to be used as address or data lines for the external memory. The unused address and data lines are used as user-defined PIO pins. PIO pins are expensive, however, so that it is necessary to preserve as many pins as possible for the user. If more than one external memory needs to be interfaced with a memory interface of a processor system, fewer pins are available for use by the user.

SUMMARY OF THE INVENTION

A integrated circuit is described. In one embodiment, the integrated circuit includes a processor, a bus coupled to the processor, a memory interface and an interface bus. The memory interface provides an interface between the bus and at least two memory devices including a first memory device and a second memory device. The interface bus is coupled to the first memory device, the second memory device and the memory interface. Control signals, address signals and data signals are transmitted over the interface bus.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 2 is a table illustrating one embodiment of the configuration of pins in the integrated circuit of FIG. 1;

DETAILED DESCRIPTION

A method and system for interfacing an integrated circuit to synchronous dynamic memory and static memory using a common set of signals is disclosed.

Figure 1:
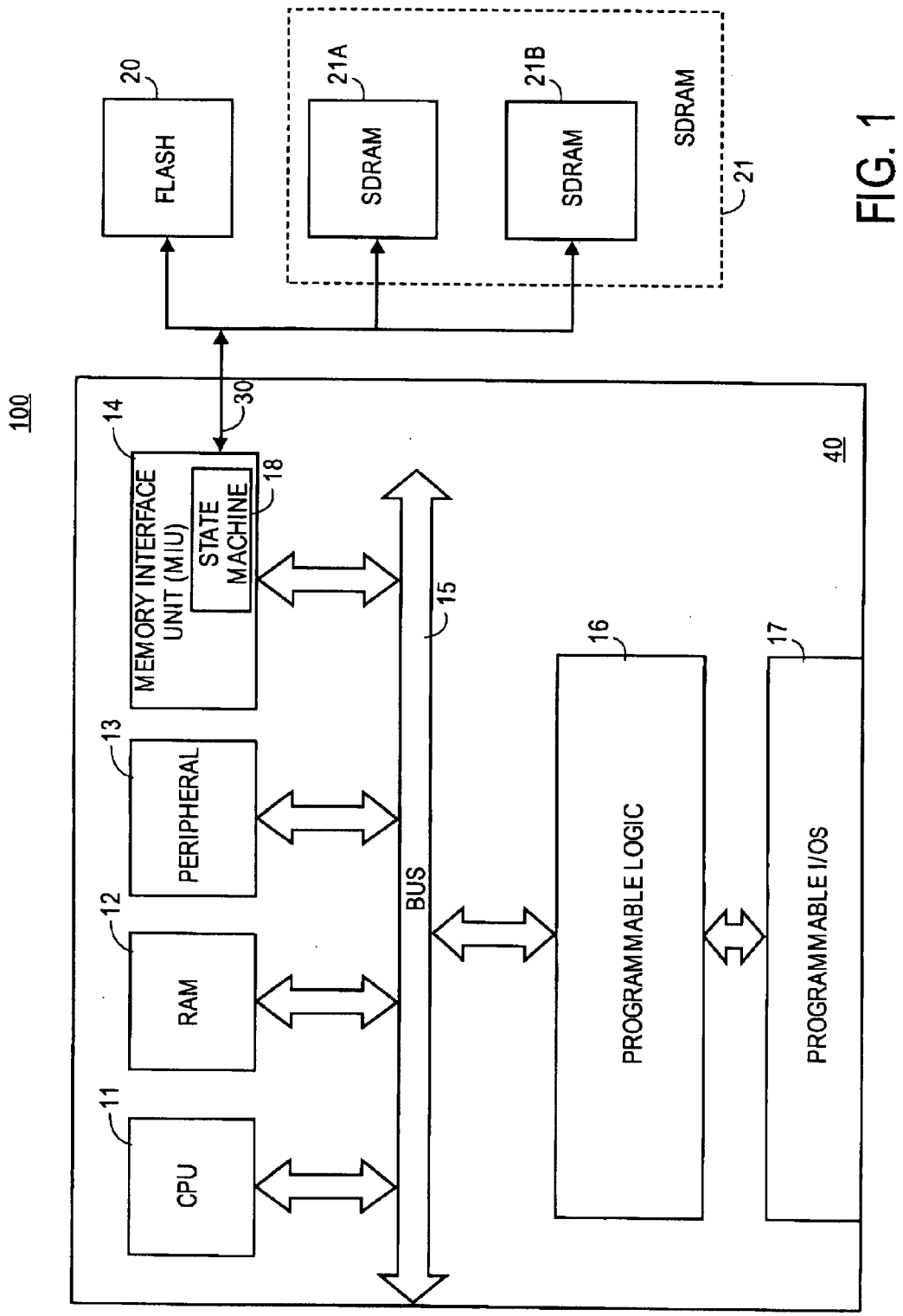
FIG. 1 is a block diagram of one embodiment of the integrated circuit of the present invention.

FIG. 1 is a block diagram of one embodiment of the integrated circuit of the present invention. The integrated circuit 100 includes a CPU 11, random access memory (RAM) 12, peripheral interface 13, memory interface unit (MIU) 14, bus 15, programmable logic 16, and programmable input/output pins 17.

CPU 11, RAM 12, peripheral interface 13, MIU 14, bus 15, programmable logic 16 and PIO pin 17 may be assembled on a single chip 40 or on many chips. CPU 11, RAM 12, peripheral interface 13, MIU 14 and programmable logic 16 are all coupled to bus 15. PIO pins 17 are coupled to the programmable logic 16. MIU 14 is connected through bus 30 to external memory devices 20, 21.

External memory devices may include a flash memory device 20 and a synchronous DRAM (SDRAM) 21. Memory device 20 may be any type of static memory device including asynchronous SRAM, flash, RAM, read only memory (ROM), erasable programmable read only memory (EPROM) and other read-only-memory devices. SDRAM 21 may include two banks 21a, 21b of SDRAM. In one embodiment, each bank of SDRAM 21a, 21b may have a width of 16-bits each, producing a total SDRAM width of 32-bits.

Interface bus 30 includes address busses and data busses. The address signals, control signals, and data signals transmitted through bus 30 are coupled to PIO pins (not shown) in MIU 14. Thus, MIU 14 may be configured to allow memory devices 20, 21 to share PIO pins so that a minimum number signals is required to support both types of memory. Sharing pins between two or more memory devices reduces pin costs. In one embodiment, flash memory 20 and SDRAM 21 may share a write enable pin (WE) address pins, and data pins. MIU 14, in one embodiment, includes state machine 18 to keep track of which memory device is controlling interface bus 30.

FIG. 2 is a table illustrating one embodiment of the configuration of pins of the integrated circuit of FIG. 1. Table 200 includes column 201, representing the pins on chip 40, column 221 representing the pins on the flash memory device 20, and column 241 representing the pins on SDRAM device 21.

Address pins 205 on chip 40 correspond to address pins 225 on flash memory device 20 and address and control pins 245–249 on SDRAM 21. Address and control pins on SDRAM 21 include row-address-strobe (RAS) 245, column-address-strobe (CAS) 246, data byte mask (DQM) 247, internal bank select (BS) 248, and address pins A 249. Data pin DQ 211 of chip 40 is mapped to flash memory device 20 data pin DQ 231 and SDRAM 21 pin DQ 251. The assignment of the signals to the address and control pins is arbitrary and the signals may be assigned in any order.

The write enable pin (WEN) 204 of chip 40 is mapped to write enable (WE) pin 224 of flash memory 20 and WE pin 244 of SDRAM 21.

To guarantee operational integrity, some critical control signal pins for each type of memory 20, 21 are not shared. Thus, chip enable pins 202 of chip 40 are mapped only to chip enables 222 of flash memory 20 and output enable 203 of chip 40 is mapped only to output enable pin 223 of flash memory device 20. System clock 212 of chip 40 is mapped only to clock signal 252 of SDRAM 21, system clock enable 213 is mapped only to clock enable 253 of SDRAM 21, and chip enables 214 of chip 40 are mapped only to chip enables 254 of SDRAM 21.

In one embodiment, the MIU 14 is applied to a system that allows support for up to 16 megabytes of flash memory with 24 bits of address. However, this is a limitation of the system and not a limitation of the memory interface. In another embodiment, the system is set up to support two external SDRAM banks. Additional banks may be added at the cost of one additional chip enable pin per new bank. Also, support for up to 256 megabytes SDRAM is available with 13 bits of address. This also is a limitation of the system and not the memory interface. The memory interface does not have any address limit constraints and is limited only by physical constraints such as, for example, the umber of address pins on a bus.

Figure 3:
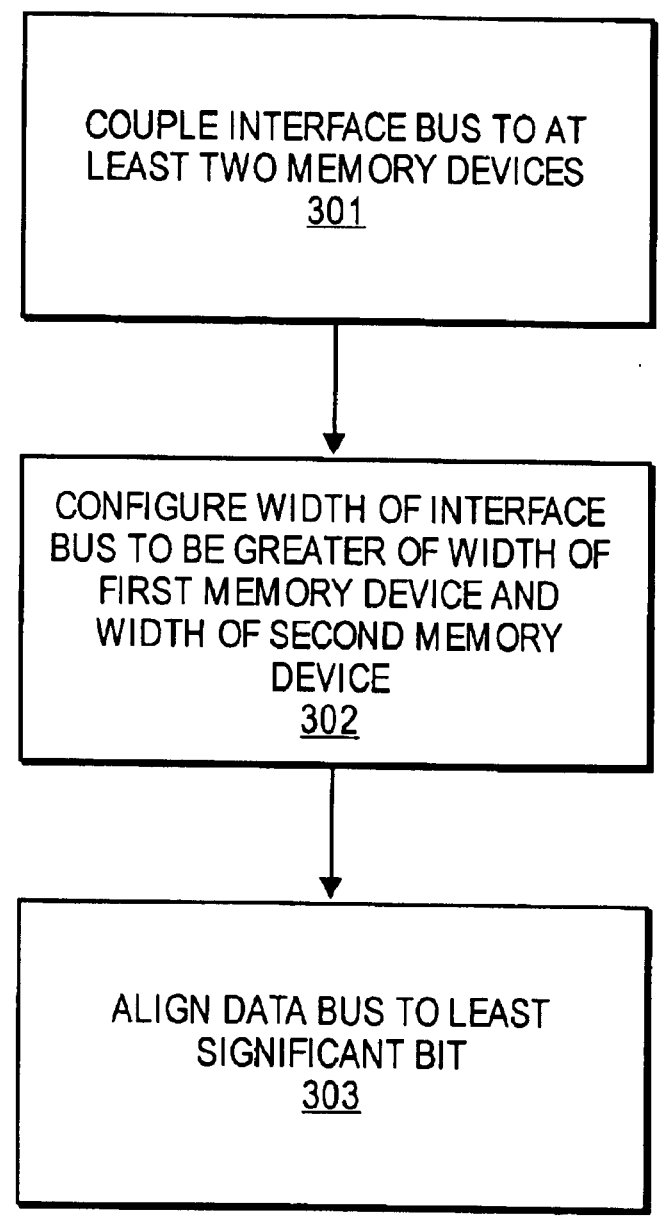
FIG. 3 is a flow diagram of one embodiment of a method of configuring the integrated circuit of FIG. 1.

FIG. 3 is a flow diagram of one embodiment of a method for configuring the integrated circuit of FIG. 1. Flow diagram 300 is illustrative of how a memory interface 14 may be configured.

At processing block 301, a interface bus 30 is coupled to at least two memory devices. The interface bus may include a data bus, an address bus and control signal bus. The data bus is coupled, in one embodiment, to the first memory device 20, the second memory device 21 and data pins 211 of chip 40 shared by the first and second memory devices 20, 21. The address bus is coupled, in one embodiment, to the first memory device 20, the second memory device 21 and address pins 205 of chip 40 shared by the first and second memory devices 20,21. The control bus is coupled, in one embodiment, to the first memory device 20, the second memory device 21 and control pins 202–204, 212–214 of chip 40, some of which are shared by the first and second memory devices 20, 21. For example, write enable pin 204 of chip 40 is shared by the first and second memory devices 20, 21 while control pins 202, 203, and 212–214 are not shared by the memory devices 20, 21.

At processing block 302, the width of interface bus 30 is configured to be the greater of the widths of the at least two memory devices. Thus, in one embodiment, the width of interface bus 30 is configured to be the greater of the width of the first memory device 20 and the width of the second memory device 21. For example, if the flash memory device 20 has a data width of 8-bits and the SDRAM 21 has a data width of 32-bits, the data bus will have a 32-bit bus width. Thus, data pins of MIU 14 may be shared by flash memory 20 and SDRAM 21.

At processing block 301, the data bus is aligned to the least significant bit. The data bus DQ 211 must be aligned to the least significant bits of the flash DQ 231 or SDRAM DQ 251.

All of the above processes are not necessary and the processes need not be performed in any particular order for the configuration of the memory interface of the present invention.

Figure 4:
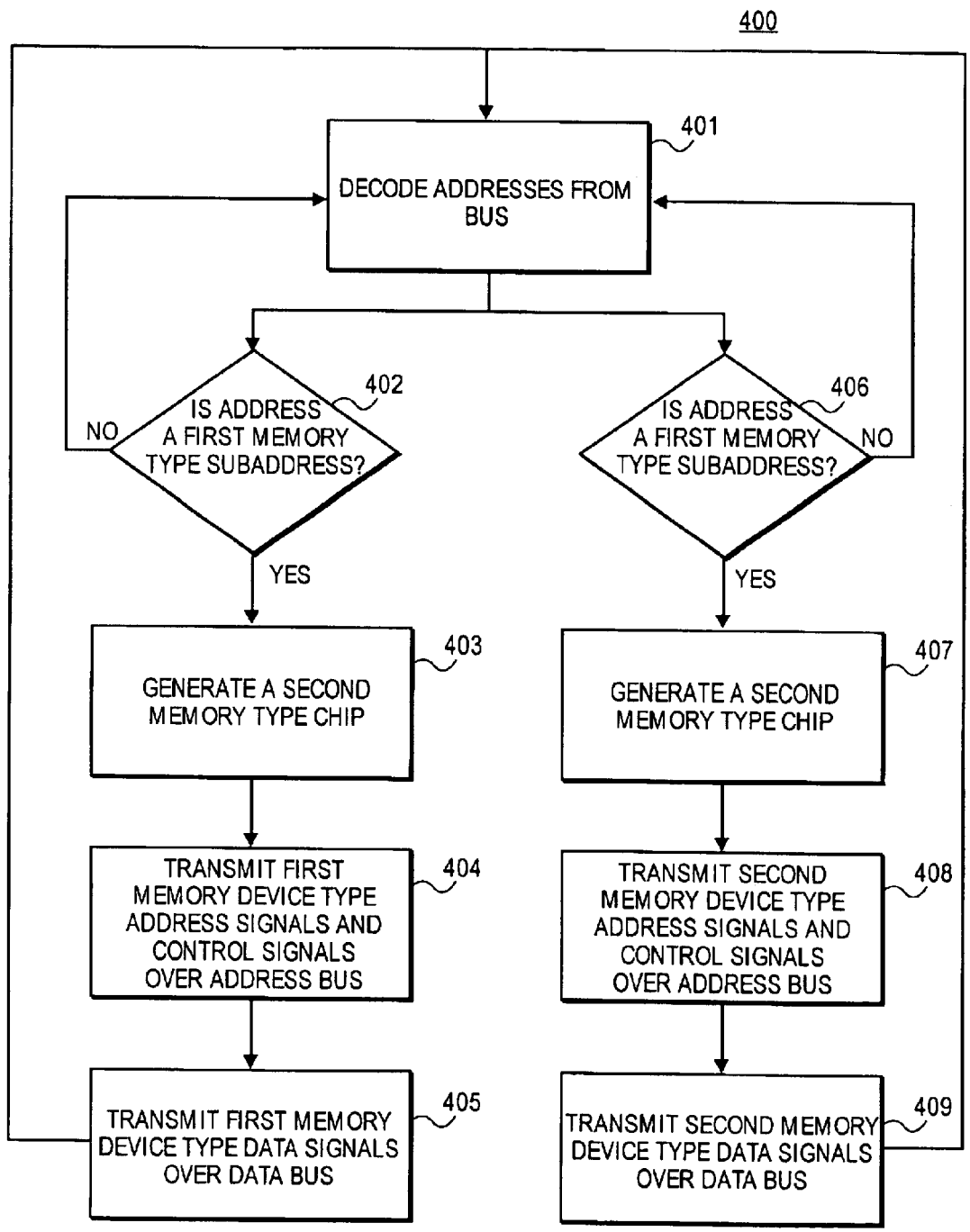
FIG. 4 is a flow diagram of one embodiment of a method of interfacing an integrated circuit to two different memory devices.

FIG. 4 is a flow diagram of one embodiment of a method of interfacing an integrated circuit to two different memory devices. Flow diagram 400 illustrates the operation of one embodiment of the memory interface 14.

At processing block 401, the MIU 14 decodes addresses on bus 15. Some subaddresses on bus 15 will be for one external memory type and some subaddresses will be for another external memory type. For example, some subaddresses will be for flash memory 20 and some subaddresses will be for SDRAM 21.

At processing block 402, the MIU determines if the address decoded is a first memory device type subaddress. If the address is a first memory device type address, the MIU 14 generates a first memory device type chip enable signal at processing block 403.

At processing block 404, first memory device type address signals and control signals are transmitted over the address and control buses. At processing block 405, first memory device type data signals are transmitted over the data bus. Then, the MIU 14 is ready to receive another address to decode from bus 15 at processing block 401. If the address is not a first memory device type address, at processing block 402, the MIU 14 returns to processing block 401 to receive another address to decode from bus 15.

At processing block 406, the MIU determines if the address decoded is a second memory device type subaddress. If the address is for a second memory device, MIU 14 generates a second memory device type chip enable signal at processing block 407. At processing block 408, second memory device type address signals and control signals are transmitted over the address and control buses. For example, if the address is a SDRAM memory device 21 type address, a SDRAM 21 type chip enable will be asserted by MIU 14 and SDRAM 21 type address signals and control signals will be transmitted over the address and control buses. At processing block 409, second memory device type data signals are transmitted over the data bus. The MIU 14 is then ready to receive another address to decode from bus 15 at processing block 401. If the address is not a second memory device type address, at processing block 406, the MIU 14 returns to processing block 401 to receive another address to decode from bus 15.

The signal generation processes described above can be performed substantially concurrently.

Figure 5:
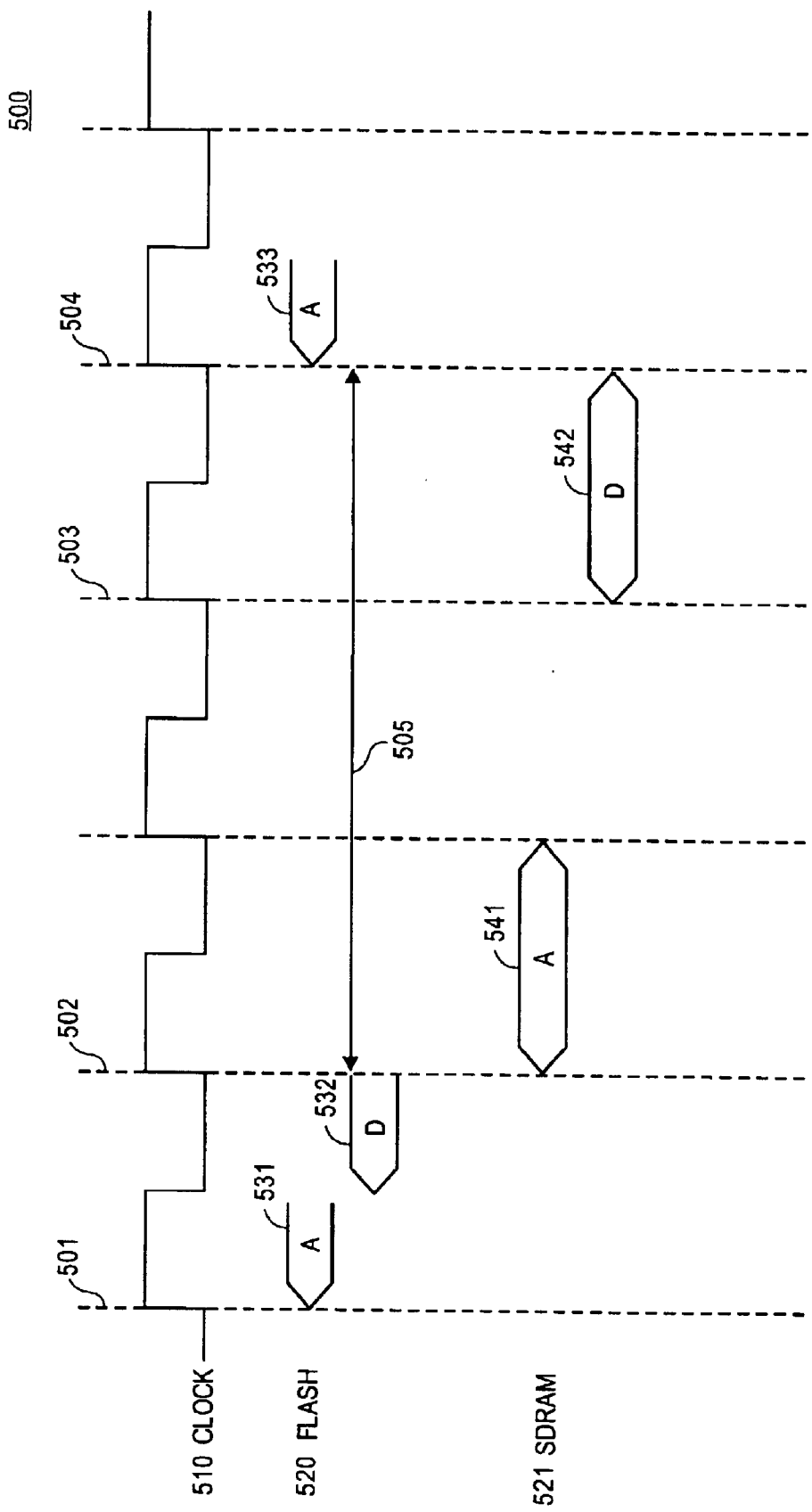
FIG. 5 is a timing diagram illustrating a read operation of the integrated circuit system of FIG. 1.

FIG. 5 is a timing diagram illustrating one embodiment of a read operation of the integrated circuit system of FIG. 1. Timing diagram 500 illustrates clock signal 510, flash device 20 read operation 520 and SDRAM 21 read operation 521.

At 501, a flash memory 20 chip enable is asserted, and flash memory device 20 address signals 531 are transmitted through the address bus. Flash memory device 20 data signals 532 are then transmitted over a data bus. At 502, a SDRAM 21 chip enable is asserted, and SDRAM address signals 541 are transmitted over the address bus. SDRAM data signals 542 are transmitted during a subsequent cycle, depending on how chip 40 is programmed. In the example shown, SDRAM 21 data signals are programmed to be transmitted in the second cycle 503 after address signals 541 are transmitted.

An internal state machine 18 in MIU 14 keeps track of what type of signal is being transmitted and will not allow a chip enable for a memory device for the period the shared buses are being used by another memory device. Thus, in the example shown, the internal state machine 18 will not allow a chip enable for flash memory device 20 during intervals 505 and 503 because a SDRAM 21 chip enable was asserted at 502 and SDRAM data 542 is scheduled to be transmitted over the shared buses at 503. Thus, contention is avoided between flash memory 20 and SDRAM 21. Flash memory 20 may not be selected until after the cycle in which data 542 is scheduled to be transmitted.

At 503, SDRAM data 542 is transmitted over the shared data bus. At 504, the flash memory device may be enabled, allowing flash memory device address signals 533 to be transmitted over the shared address bus. Thus, in the embodiment described, MIU 14 controls the pins and the sequences of accesses.

The processes described herein may be performed by processing logic, which may comprise hardware, software, or a combination of both.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signal (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

I claim:

1. An integrated circuit comprising:
   a processor;
   a bus coupled to the processor; and
   a memory interface having input/output pins (IO) to provide an interface between the bus and at least two memory devices including a first memory device and a second memory device, wherein the memory interface asserts a first enable to transmit data to the first memory device via shared I/O pins and asserts a second enable to transmit data to the second memory device via shared I/O pins;
   an interface bus, coupled to the first memory device, the second memory device and the memory interface, to transmit control signals, address signals and data signals received from shared IO pins at the memory interface.

2. The integrated circuit of claim 1 wherein the integrated circuit is a configurable system-on-chip.

3. The integrated circuit of claim 1 further comprising programmable logic coupled to the bus.

4. The integrated circuit of claim 1 wherein the interface bus allows different widths of the at least two memory devices.

5. The integrated circuit of claim 1 wherein the first and second memory devices share data buses connecting the first and second memory devices on the same pin, and first memory device data signals are transmitted through the shared data buses when a first memory chip enable type is asserted and second memory device data signals are transmitted through the shared data buses when a second memory type chip enable is asserted.

6. The integrated circuit of claim 5 wherein the shared data bus width is the greater of the width of the first memory device data width and the second memory device data width.

7. The integrated circuit of claim 1 wherein the at least two memory devices share an address bus, and first memory device address signals and control signals are transmitted through the address bus when a first memory device type chip enable is asserted and second memory device address signals and control signals are transmitted through the address bus when a second memory device type chip enable is asserted.

8. The integrated circuit of claim 1 wherein the at least two memory devices share a write enable pin.

9. The integrated circuit of claim 1 wherein the first memory device is a flash memory device.

10. The integrated circuit of claim 1 wherein the first memory device is one of the group consisting of: asynchronous static random access memory, and erasable programmable read only memory.

11. The integrated circuit of claim 1 wherein the first memory device is a read only memory device.

12. The integrated circuit of claim 1 wherein the second memory device is a synchronous dynamic random access memory device.

13. The integrated circuit of claim 1 further comprising a state machine in the memory interface to track data on the first memory device to prevent contention between the first memory device and the second memory device.

14. A method comprising:
   interfacing an integrated circuit to a first memory device and a second memory device by coupling an interface bus to the first memory device, the second memory device and a set of input/output pins (IO) pins at the integrated circuit to be shared by the first and second memory devices, wherein the integrated circuit asserts a first enable to transmit data to the first memory device via the shared I/O pins and asserts a second enable to transmit data to the second memory device via the shared I/O pins;
   configuring a width of the interface bus to be the greater of a width of the first memory device and a width of the second memory device; and
   aligning a data component of the interface bus to a least significant bit.

15. The method of claim 14 wherein coupling the interface bus to the first memory device, the second memory device and the set of pins to be shared by the first and second memory devices comprises:
   coupling data buses to the first memory device, the second memory device and a set of data pins shared by the first memory device and the second memory device;
   coupling address buses to the first memory device, the second memory device and a set of address pins shared by the first memory device and the second memory device; and
   coupling control buses to the first memory device, the second memory device and a set of control pins shared by the first memory device and the second memory device.

16. The method of claim 14 further comprising configuring a write enable pin of the integrated circuit to be shared by the first and second memory devices.

17. A method comprising:
   interfacing an integrated circuit to a first memory device and a second memory device by transmitting first memory type address signals and control signals over an address bus shared by the first and second memory devices received from shared input/output pins (IO) pins at the integrated circuit when a first memory type chip enable is asserted;
   transmitting first memory type data signals over a data bus shared by the first and second memory devices via the shared IO pins when the first memory type chip enable is asserted;
   transmitting second memory type address signals and control signals over the address bus when a second memory type chip enable is asserted; and
   transmitting second memory type data signals over the data bus shared by the first and second memory devices when the second memory type chip enable is asserted.

18. The method of claim 17 further comprising tracking data on the first memory device to prevent contention between the first memory device and the second memory device.

19. The method of claim 17 wherein the first memory device is a flash memory device.

20. The method of claim 17 wherein the first memory device is one of the group consisting of: asynchronous static random access memory, and erasable programmable read only memory.

21. The method of claim 17 wherein the first memory device is a read only memory device.

22. The method of claim 17 wherein the second memory device is a synchronous dynamic random access memory device.

23. A means for interfacing an integrated circuit to a first memory device and a second memory device using a common set of signals, comprising:

means for transmitting first memory type address signals over an address bus shared by the first and second memory devices via shared input/output pins (IO) pins at the integrated circuit when a first memory type chip enable is asserted;

means for transmitting first memory type data signals over a data bus shared by the first and second memory devices via the shared IO pins when the first memory type chip enable is asserted;

means for transmitting second memory type address signals over the address bus when a second memory type chip enable is asserted; and means for transmitting second memory type data signals over the data bus shared by the first and second memory devices when the second memory type chip enable is asserted.

24. The means of claim 23 further comprising means for transmitting first memory type control signals over the address bus when the first memory type chip enable is asserted.

25. The means of claim 23 further comprising means for tracking data on the first memory device to prevent contention between the first memory device and the second memory device.

26. A machine-readable medium having stored thereon instructions, which when executed by a set of processors, cause said set of processors to perform the following:

transmit first memory type address signals and control signals over an address bus shared by the first and second memory devices received from shared input/output pins (IO) pins at an integrated circuit when a first memory type chip enable is asserted;

transmit first memory type data signals over a data bus shared by the first and second memory devices via the shared IO pins when the first memory type chip enable is asserted;

transmit second memory type address signals and control signals over the address bus when a second memory type chip enable is asserted; and transmit second memory type data signals over the data bus shared by the first and second memory devices when the second memory type chip enable is asserted.

27. The machine-readable of claim 26 further comprising instructions to perform the following:

track data on the first memory device to prevent contention between the first memory device and the second memory device.

28. A machine-readable medium having stored thereon instructions, which when executed by a set of processors, cause said set of processors to perform the following:

couple an interface bus to the first memory device, the second memory device and a set of input/output pins (IO) pins at an integrated circuit shared by the first memory device and the second memory device, wherein the integrated circuit asserts a first enable to transmit data to the first memory device via the shared I/O pins and asserts a second enable to transmit data to the second memory device via the shared I/O pins;

configure width of an interface bus to be the greater of a width of the first memory device and a width of the second memory device; and align a data bus of the interface bus to the least significant bit.

\* \* \* \* \*